US011883969B2

(12) United States Patent
Woffindin

(10) Patent No.: US 11,883,969 B2
(45) **Date of Patent: *Jan. 30, 2024**

(54) HAIR SCULPTOR

(71) Applicant: AUTOLIFE LIMITED, Auckland (NZ)

(72) Inventor: Michael Francis Woffindin, Auckland (NZ)

(73) Assignee: AUTOLIFE LIMITED, Auckland (NZ)

( * ) Notice: Subject to any disclaimer, the term of this patent is extended or adjusted under 35 U.S.C. 154(b) by 0 days.

This patent is subject to a terminal disclaimer.

(21) Appl. No.: 17/670,392

(22) Filed: Feb. 11, 2022

(65) Prior Publication Data

US 2022/0161450 A1 May 26, 2022

Related U.S. Application Data

(63) Continuation of application No. 16/490,809, filed as application No. PCT/NZ2018/050021 on Mar. 2, 2018, now Pat. No. 11,279,051.

(30) Foreign Application Priority Data

Mar. 3, 2017 (NZ) ....................................... 729705

(51) Int. Cl.

*B26B 19/20* (2006.01)
*A45D 44/00* (2006.01)
*B26B 19/38* (2006.01)

(52) U.S. Cl.

CPC .............. *B26B 19/20* (2013.01); *A45D 44/00* (2013.01); *B26B 19/388* (2013.01); *A45D 2044/007* (2013.01)

(58) Field of Classification Search

CPC ..... Y10T 83/04; Y10T 83/141; Y10T 83/162; Y10T 83/164; Y10T 83/849; B26B 19/20; B26B 19/388; B26B 19/00; B26B 19/04; B26B 19/06; B26B 19/12; B26B 19/3873; A45D 44/00; A45D 2044/007

USPC ....... 30/195, 200–202, 208–210, 233, 233.5, 30/241

See application file for complete search history.

(56) References Cited

U.S. PATENT DOCUMENTS

| | | | |
|---|---|---|---|
| 5,875,790 | A | 3/1999 | Morrison |
| 8,474,466 | B2 | 1/2013 | Larkin |
| 8,826,922 | B1 | 9/2014 | Lewis |
| 8,941,727 | B2 | 1/2015 | Rassman et al. |

(Continued)

FOREIGN PATENT DOCUMENTS

| | | | |
|---|---|---|---|
| CN | 104942842 | A | 9/2015 |
| DE | 19910837 | A1 | 9/2000 |

(Continued)

OTHER PUBLICATIONS

Michael Francis Woffindin, "Hair Sculptor," filed Sep. 3, 2019, U.S. Appl. No. 16/490,809.

(Continued)

*Primary Examiner* — Phong H Nguyen

(57) ABSTRACT

A hair length mapping or cutting device uses multiple comb elements to capture bunches of hair as it is traversed across a scalp. The comb elements are traversed away from the scalp to individually measure or cut each bunch of hair to length. Hair may be cut to conform to a hair style mapped, for instance, from an earlier measurement of a hair style.

18 Claims, 7 Drawing Sheets

(56) References Cited

U.S. PATENT DOCUMENTS

| | | | |
|---|---|---|---|
| 2014/0102271 | A1 | 4/2014 | Krenik |
| 2015/0059187 | A1 | 3/2015 | Krenik |
| 2015/0217465 | A1 | 8/2015 | Krenik |
| 2015/0321365 | A1 | 11/2015 | Lauritsen |
| 2016/0330933 | A1 | 11/2016 | Baier |
| 2017/0072577 | A1 | 3/2017 | Darwinkel et al. |
| 2020/0001483 | A1 | 1/2020 | Woffindin |

FOREIGN PATENT DOCUMENTS

| | | | |
|---|---|---|---|
| EP | 3558604 | B1 | 8/2020 |
| WO | 2013163999 | A1 | 11/2013 |
| WO | 2015067634 | A1 | 5/2015 |
| WO | 2015068068 | A1 | 5/2015 |
| WO | 2018160075 | A1 | 9/2018 |

OTHER PUBLICATIONS

Office Action dated Dec. 18, 2020, U.S. Appl. No. 16/490,809, filed Sep. 3, 2019.

Final Office Action dated Oct. 1, 2021, U.S. Appl. No. 16/490,809, filed Sep. 3, 2019.

Notice of Allowance dated Dec. 29, 2021, U.S. Appl. No. 16/490,809, filed Sep. 3, 2019.

Foreign Communication from a Related Counterpart Application, Chinese Office Action dated Nov. 17, 2021, Chinese Application No. 201880011765.1 filed on Mar. 2, 2018.

Foreign Communication from a Related Counterpart Application, International Search Report dated Jun. 21, 2018, International Application No. PCT/NZ2018/050021 filed on Mar. 2, 2018.

Foreign Communication from a Related Counterpart Application, International Preliminary Report on Patentability dated Sep. 3, 2019, International Application No. PCT/NZ2018/050021 filed on Mar. 2, 2018.

HAIR SCULPTOR

CROSS-REFERENCE TO RELATED APPLICATIONS

The present application is a continuation of U.S. application Ser. No. 16/490,809 filed on Sep. 3, 2019, which claims priority to 35 U.S.C. 371 National Stage of International Application No. PCT/NZ2018/050021, filed Mar. 2, 2018, entitled "HAIR SCULPTOR," which claims priority to New Zealand Application No. 729705 filed with the Intellectual Property Office of New Zealand on Mar. 3, 2017, all of which are incorporated herein by reference in their entirety for all purposes.

TECHNICAL FIELD

The invention generally relates to a hair length mapping device for a person which is alternatively adapted to cut a persons hair to a desired hair style.

Preferably the invention includes a comb device which is capable of mapping the length of or cutting to a designated length small bunches of hair at multiple locations on the head of a person.

BACKGROUND ART

Devices for cutting hair to a length desired for a particular style are known and generally provide some method of detecting the position of a cutting device and some method of adjusting the length of hair being cut by the cutting device. The critical elements of the design relate to the ability to detect where the cutter is in relation to the persons head and what the length of hair is to be at that position on the persons head, given that in some hair styles a difference of millimetres in position may relate to a difference of centimetres in hair length.

For instance patent specification WO2013163999A1 relates to creating an electromagnetic field around a persons head, detecting the position of calibration points on the head and then varying the position of comb and/or cutter on a cutting device to vary the distance of the cutter from the head. Similarly WO2015067634A1 relates to an electromagnetic, optical, inertial or other positioning system detecting the position of head contours and the position of a cutting element which is adjusted for distance and angle from the head.

Patent specification DE19910837 describes a hair cutter which measures hair length by counting the number of turns of a roller contacting the hair.

Patent specification WO2015068068 describes a hair cutting device in which a motorized cutter is positioned a required distance from a portion of a scalp as it is moved around a head, however no method of entraining hair in the cutter is described.

Such hair cutting systems fail to solve all the known problems of how to cope with a grading in the length of hair required by a hair style, which may change length abruptly, how to detect the length of graded hair in a hair style and apply such a grading in a position delimited in millimetres.

Therefore a need exists for a solution to the problem of accurately positioning a cutting or hair length detector and accurately applying the grading of hair length required for a hair style.

The present invention provides a solution to this and other problems which offers advantages over the prior art or which will at least provide the public with a useful choice.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art, in New Zealand or in any other country.

SUMMARY OF THE INVENTION

These and other features of as well as advantages which characterise the present invention will be apparent upon reading of the following detailed description and review of the associated drawings.

The invention relates to a hair length mapping device mapping the length of hair on a substrate and providing:

- multiple hair retaining comb devices, each comb device shaped to slideably entrain one or more hairs adjacent the substrate
- each comb device being retractable from the substrate a measureable distance while retaining slideably entrained hair
- each comb device detecting when the measureable distance exceeds the length of the captured hair
- the position each comb device of the hair length mapping device being mappable in relation to a current position to the substrate.

Preferably the substrate is a persons scalp.

Preferably the location of the hair length mapping device in relation to the substrate is determined by detecting the location of hair length mapping device relative to a beacon system and detecting the location of the substrate in relation to the same beacon system.

Preferably each comb device includes at least one comb element having a flexible conductive hair engaging filament, normally in contact with a conductive element of a comb tooth and capable of being urged away from the comb tooth by engagement of hair with the flexible conductive hair engaging filament.

In an alternative embodiment the invention relates to a hair length cutting device cutting to a predetermined length the hair on a substrate and providing:

- at least one hair retaining comb device, each hair retaining comb device having one or more comb elements each shaped to slideably entrain one or more hairs adjacent the substrate
- each comb device being retractable from the substrate a measureable distance while slideably retaining entrained hair,
- the position of each comb device of the hair length cutting device being mappable in relation to the substrate,
- cutting the hair at the each comb device when the measureable distance exceeds a specified length for a comb device at the mappable position of the comb device on the substrate.

Preferably the cutting device is moved in steps over the substrate and the combs of each comb device are advanced before each step and retracted after the step.

Preferably the comb device separates the hair into bunches, the bunches are positioned in the path of hair retaining devices associated with the comb and the comb and hair retaining devices are moved to tension the hairs to be cut.

Preferably each comb device has comb teeth with a hair bunch retaining portion and wherein hair transfer teeth are provided moving hair within the comb device into engagement with a hair bunch retaining portion of a comb tooth.

Preferably when the comb device is retracted the entrained hairs are cut to a measured length.

Preferably cut hairs are removed from within the cutter device by a belt covered in filamentary hooked material.

In a further embodiment the invention relates to a method of cutting hair by:

- providing at least one hair retaining comb device capable of slideably entraining one or more hairs adjacent to a substrate,
- repeatedly entraining hair within the at least one hair retaining comb device as a number of hair bunches,
- repeatedly tensioning the entrained hair bunches to a continually adjustable predetermined length,
- repeatedly cutting the entrained hair bunches to a length less than the predetermined length.

Preferably the hair retaining comb device includes comb teeth each configured to retain a hair bunch in a hair retaining portion.

Preferably the hair retaining comb device includes hair transfer teeth each configured to repeatedly move hair into a comb tooth hair retaining portion.

These and other features of as well as advantages which characterise the present invention will be apparent upon reading of the following detailed description and review of the associated drawings.

DESCRIPTION OF THE INVENTION

Figure 1:
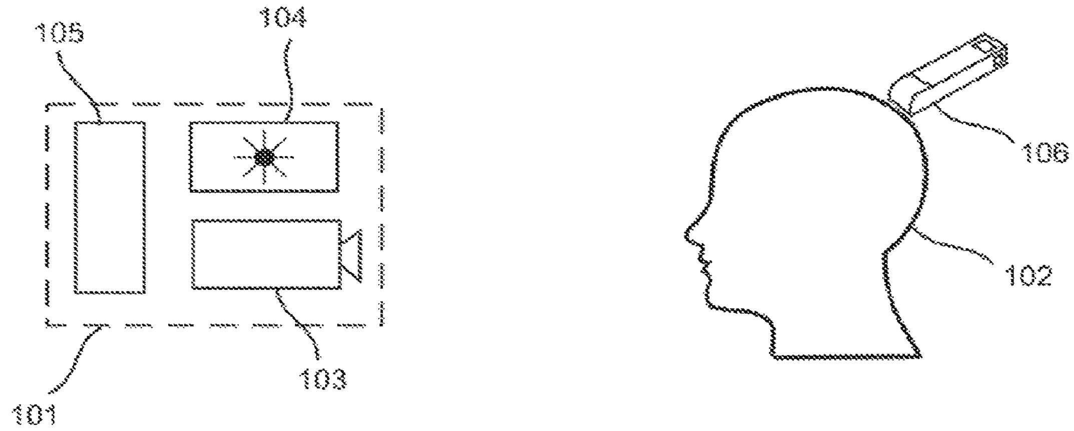
FIG. 1 is a general side view of a hair trimming device and associated equipment.
Figure 2:
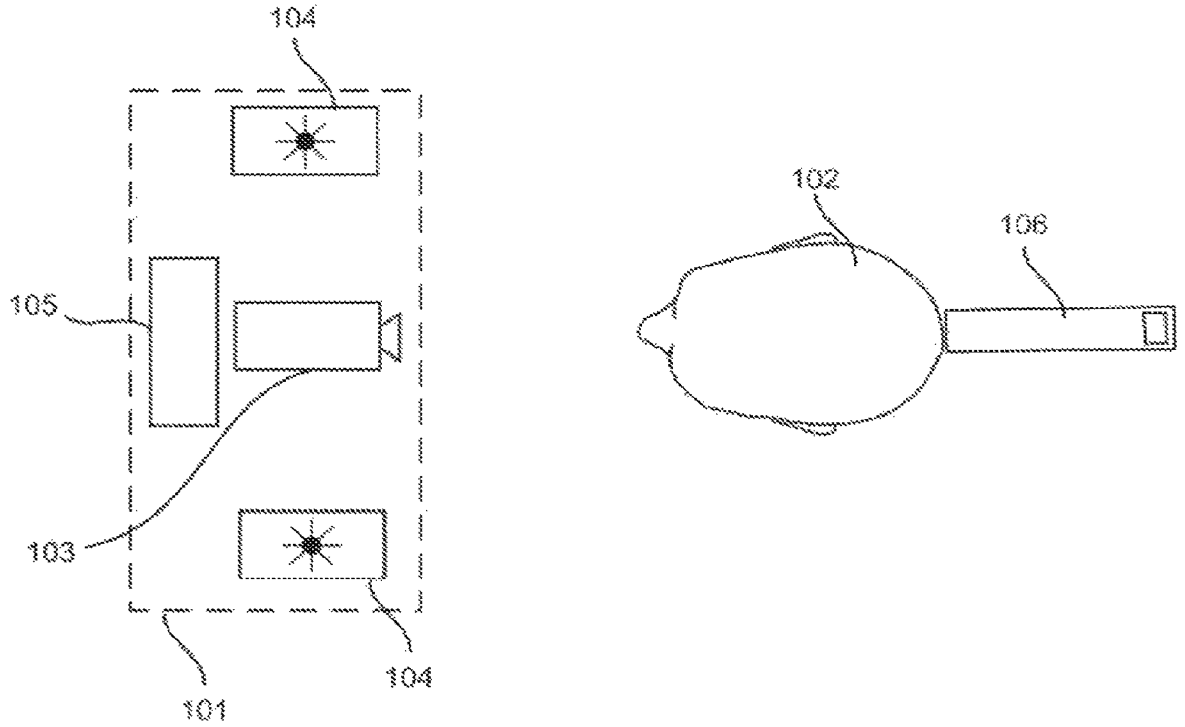
FIG. 2 is a top view of the device and equipment of FIG. 1.

Referring now to FIGS. 1 and 2 a hair styling system is shown. The system includes a user 102 whose hair style is either being cut or measured, a control box 101 which contains equipment for calculating the shape of the head of 102 using control module 105 and optionally one or more cameras 103 and one or more position establishing modules 104. A device 106 may optionally measure the shape of the users head, mapping the length of the users hair at many positions on the users head (the hair style currently applied) or may cut the users hair to the length required for the application of a known style to the users head.

Preferably the control box includes camera 103 whose main purpose is to track the inclination, rotation and distance of a users head 102. Preferably it does this by identifying in known manner key points on the users face, such as the eyes, nose, chin and mouth and tracking these to determine changes in orientation of the head 102.

A measuring or cutting device 106 has sensors on it which can react to signals from the position establishing modules 104 or other such modules elsewhere around the user to issue signals allowing the control module 105 to determine the location of the device 106 relative to the users head 102.

Typically devices 104 may be laser beacons of the type issuing an omnidirectional signal before executing a timed vertical or horizontal traverse of the surroundings. Optical sensors on device 106 may detect the omnidirectional signal and then the instant in the time traverse which is intercepted by a particular sensor on the device 106. Correlating the detection of the omnidirectional signal with the time of the detected traverse indication provides the bearing of the device 106 from the laser beacon. The detection of sufficient traverses on a device 106 allows the derivation of the location of the device 106 sensors (with increasing accuracy if two laser beacons are present). This location may be combined with accelerometer information from the device 106 to provide interpolation of the device position and prediction of the expected position.

Taking data from multiple separated sensors on device 106 allows calculation of the attitude of the device 106, and if the device is pressed against a persons head and the length of the device is known the location of a point on the persons head can be calculated in relation to the orientation data from the camera 103.

Other systems of locating the position of the device 106 in relation to a persons head, such as electromagnetic, sonic or optical may be used and preferably the accuracy of the location will be in the order of 1 mm.

Figure 3:
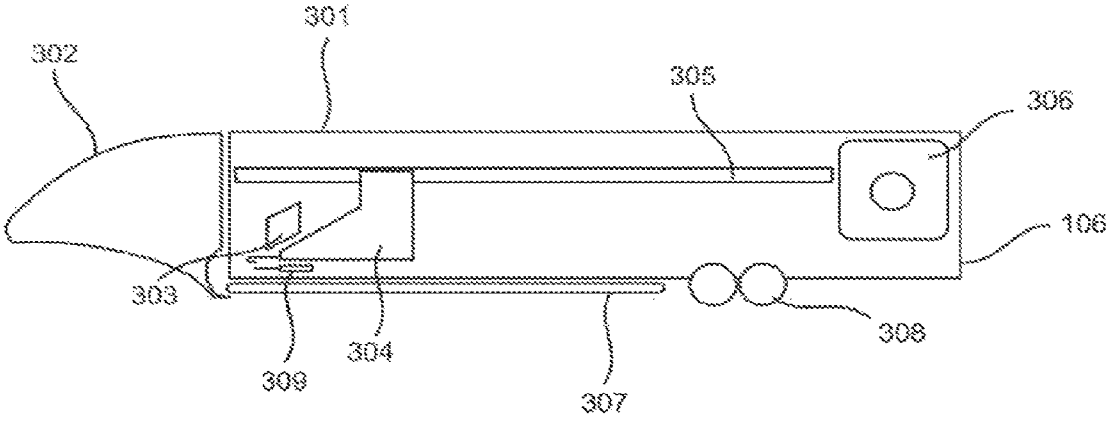
FIG. 3 is a side view of the essentials of one type of hair cutting device as used in the invention.

FIG. 3 shows a side view of the structure of one construction of a hair measuring and cutting device 106. The device includes a body 301 having attached at the end to contact a persons head a hair guide 302 and having located within body 301 a hair measurement and cutting subassembly including a cutting unit 303 and a comb unit 304. The subassembly of units 303 and 304 may be moved longitudinally of the body 301 on rails 305 under the control of at least one motor 306. In operation the measurement and cutting subassembly 303,304 is progressed towards hair guide 302 and then withdrawn having slideably engaged with hair within the hair guide 302. The body 301 may have a hair clearance belt 307 for clearing hair from the measurement and cutting subassembly 303, 304 to allow more hair to be processed. The hair measuring and cutting device 106 may also include hair removal rollers 308 to remove cut hair from inside body 301. Also provided as part of the comb unit 304 may be a comb tooth set 309 arranged below the comb unit and having teeth which may move to engage the hair with the comb unit 304.

Figure 4:
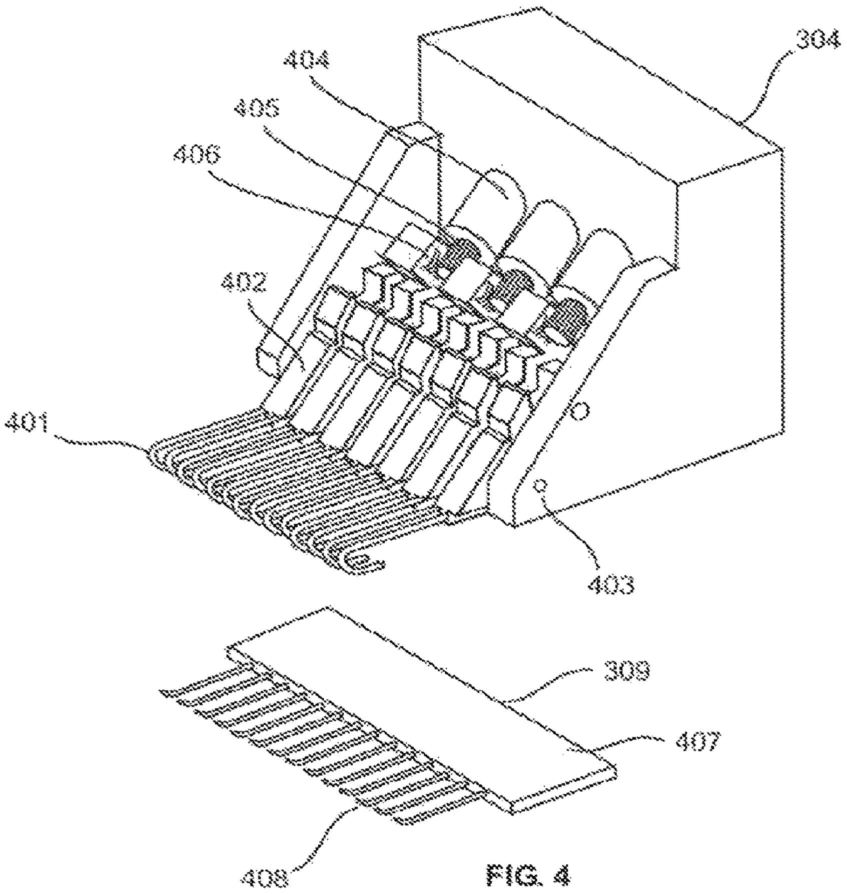
FIG. 4 is a perspective view of the hair engaging comb unit of the hair trimming device of FIG. 1

FIG. 4 shows a perspective view of the comb unit subassembly 304 which includes extensions supporting a pivot axle for multiple comb elements 401, which in the embodiment shown are mounted in pairs on comb supports 402. Each comb support 402 may be independently pivoted by one of multiple motors 404 having a rotatable gear 405 meshing with teeth 406 on the comb support 402. The comb elements 401 are preferably filaments of resilient conductive material and are biased into engagement with comb teeth 406 which may also be conductive. Engagement of comb elements 401 with a hair or hairs preferably biases a comb element 401 away from a comb tooth 406 until the comb moves beyond the end of the hair.

With the device in contact with the subjects head, scalp or some other hairy substrate the comb tooth set 309 is shown moved away from engagement with comb teeth 401 and consists of a tooth block 407 and embedded teeth 408. Transverse movement of the comb tooth set 309 moves hair into engagement with comb elements 401. Other constructions of the comb tooth set 309 may be used to assist in moving hair into engagement with the cutters.

Figure 5:
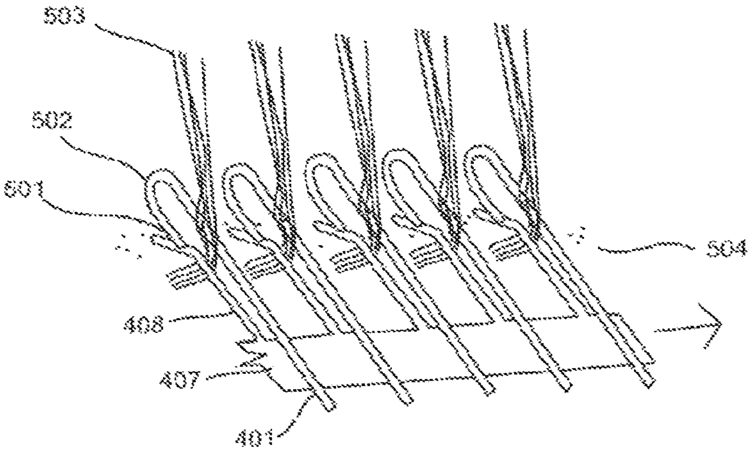
FIG. 5 is a closeup view of the combs of the device of FIG. 4 engaging hairs.

FIG. 5 shows how the comb elements 401 have loops 502 with a loop entrance defining extension 501 such that when the comb is moved across the scalp 504 of a person the comb loop 502 traps a bundle of hair 503. Comb elements are preferably about 1.6 mm apart but other distances are suitable. Preferably the loop entrance of a comb tooth 401 is normal to the persons scalp.

Engagement of the hair with the comb loops 502 may be assisted by comb tooth set where tooth block 407 with attached transfer teeth 408 is repeatedly moved transversely by substantially the distance between comb loops 401. This action sweeps the hair bunch against the shaft of a tooth 401 allowing extension loops 502 to capture and retain the bunch of hair when the comb moves.

The teeth of the comb tooth set 309 are preferably angled at the tips at 45 degrees laterally to the shaft 408 and at rest the angled tip of a comb tooth 408 is preferably in line with the loop 502 of the comb. The angled tips of comb teeth 408 provide a sweeping action beneath hook extensions 501 when moving sideways to assist the transfer action.

Figure 6:
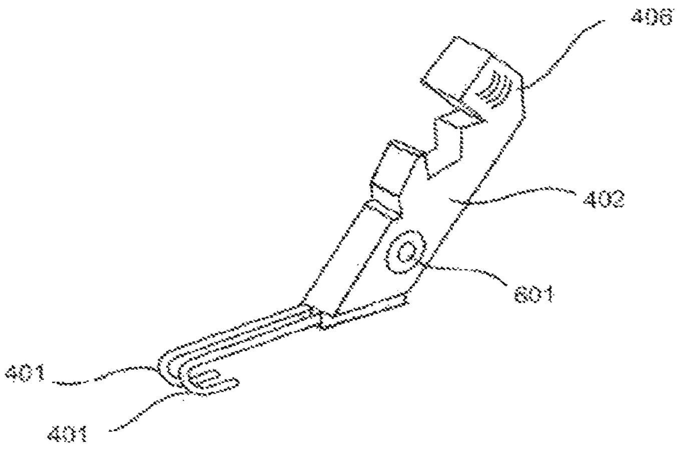
FIG. 6 shows one element of the combing device of FIG. 4.

FIG. 6 more clearly shows the comb support 402 with two comb elements 401 and a pivot bearing 601 allowing movement of the comb support 402 perpendicular to a persons scalp. Teeth 406 engage with a motor gear on motor 404 through a range of pivotal movement. Other methods of moving the comb elements 401 perpendicular to a persons scalp may be used, for instance piezoelectric elements.

Figure 7:
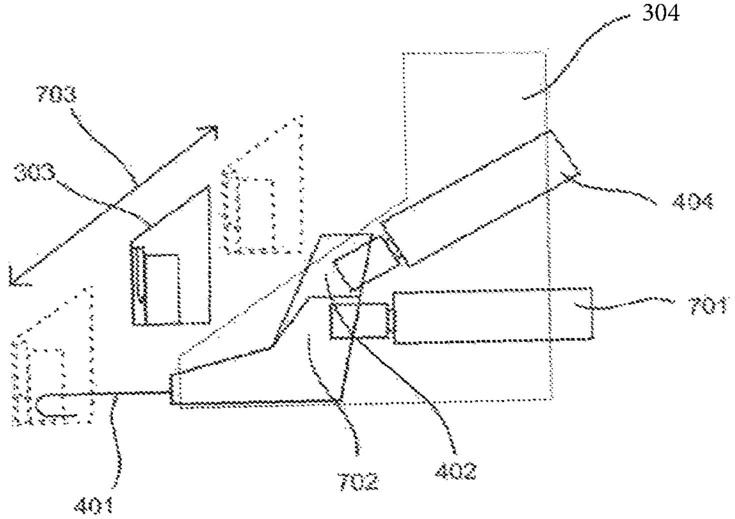
FIG. 7 shows the adjustment of the cutting device of FIG. 4 relative to the combing device.

FIG. 7 shows a side view of the measuring and cutting subassembly 303, 304 where the cutting unit 303 is repeatedly traversed angularly away from and towards comb elements 401. This is preferably done by allowing the forward motion of the comb unit 304 to mechanically raise cutting unit 304 as it approaches a forward limit position. As the comb unit reaches the forward limit position comb elements 401 are adjacent the scalp. As the comb unit 304 retreats the hooks of comb elements engage with bunches of hairs 503. This allows the combs to entrain bunches of hair as the measuring and cutting device 106 is traversed over the persons head and to allow the hair to slide back through the hooks of the comb elements as the comb unit 304 retreats from the forward position. As each bunch is entrained by moving the comb unit back the cutting subassembly 303 moves down over the comb elements 401. Once there the cutting subassembly may either detect the presence of hair in the cutting subassembly by optically or physically detecting the hair within and comb elements 401 may be pivoted upwards to engage a bunch of hair with the cutter of the cutting subassembly 303. The whole of the measuring and cutting subassembly may be traversed back by motor 306 (FIG. 3) in order to either measure the length of hair while it is slideably entrained in the comb elements 401 or to set a cutting distance so that hair still entrained in comb elements 401 can, by pivoting a comb support, raise the hair bunch in to a cutter of the measuring and cutting subassembly 303 Where space does not allow the placing of individual motors for each comb support 402 a second series of differently proportioned comb supports 702 may be provided with motors 701.

Figure 8:
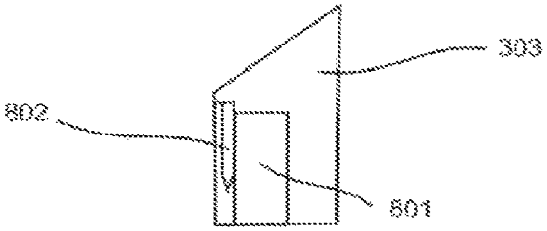
FIG. 8 shows a side view of the cutting device of the hair trimming device of FIG. 1.
Figure 9:
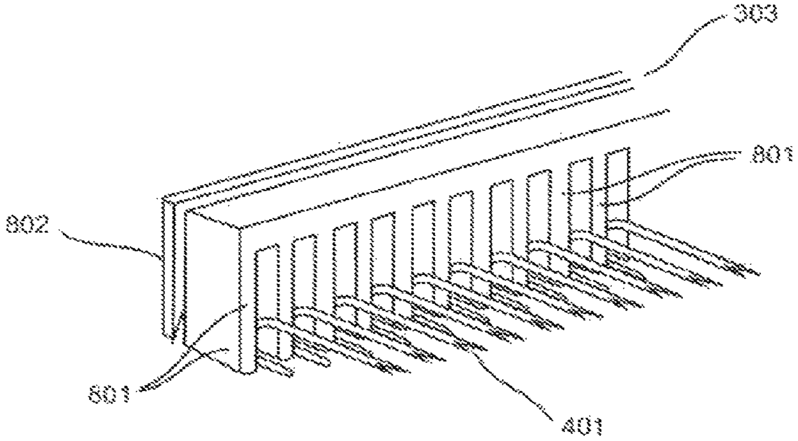
FIG. 9 shows a perspective view of the cutting device engaged with the combs of the combing device.

FIG. 8 and FIG. 9 show in more detail the side profile of the measuring and cutting head 303 having a toothed array of comb delimiting blocks 801 and a transversely reciprocable cutting blade 802. The comb blocks 801 may be of a material with a high coefficient of friction relative to hair in order to lightly grip the hair. Cutting blade 802 is normally above hair entrained in comb elements 401 and will only cut hair entrained in comb elements 401 when comb support 402 is pivoted to raise the comb elements 401. Because the comb supports 402, 702 are individually pivotable the time at which a comb support is pivoted allows control of the time at which entrained hair is cut (if at all).

Figure 10:
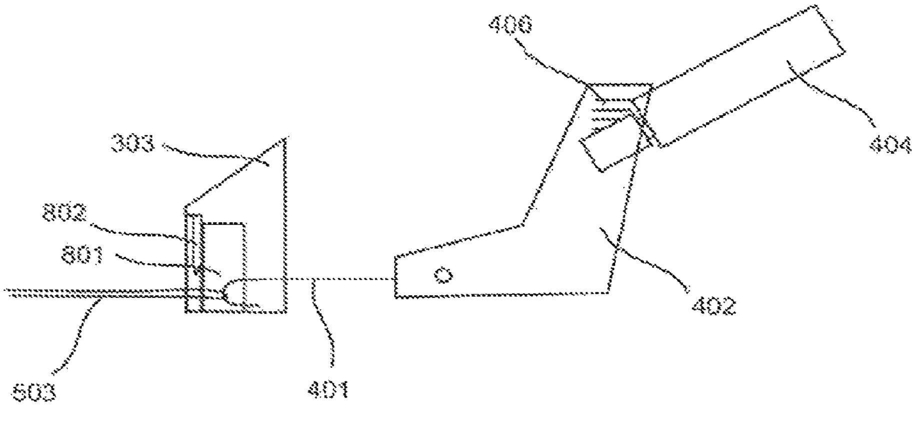
FIG. 10 shows a comb and cutting device of the hair trimming device engaged with hair.

FIG. 10 shows hair 503 entrained in a comb element 401 and contacting one of teeth 801 of the toothed array. Comb support block is in the lowered position and the cutter blade 802 is above hair bunch 503.

Figure 11:
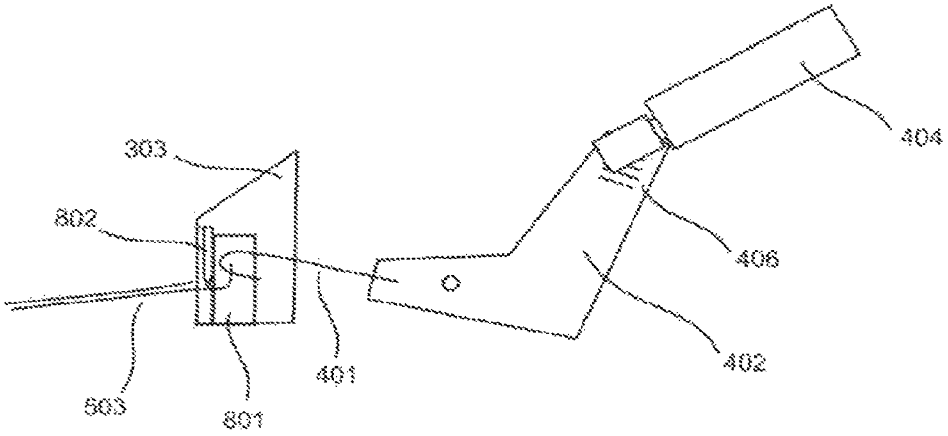
FIG. 11 shows the comb and cutter of FIG. 10 with the comb tilted to engage hair with the cutter.

FIG. 11 shows the same captured hair with the comb support in the pivoted position in which the hair now contacts blade 802 and is being cut. The cutting and measuring subassembly and the comb subassembly may have been translated further from the persons head than the position shown in FIG. 10 to set the length of hair to be cut off.

Figure 12:
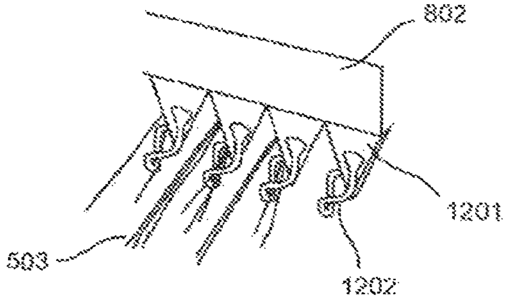
FIG. 12 shows the optional hair guards for the cutters of FIG. 9.

FIG. 12 shows a variation of the cutter head 802 in which edentate portions 1201 positioned at each hair bunch 503 have a hair guard 1202. Each comb element will have engaged hair on the scalp and the comb element will have been pulled a distance from the scalp corresponding to the length the hair bunch is to be cut to, in the process forming a loop through the comb. The hair guard 1202 functions by engaging the hair attached to the scalp, which will be taut, and lifting this hair into engagement with the cutting blade 802 as the comb support 402 rises. The cut hair ends remain trapped in the comb and protected by the guards 1202 for later removal. In this way each hair will not be cut twice as it loops past the cutter blade.

Because the comb supports are independently pivotable they may be rotated upwards individually as the cutting and measurement subassemblies are moved away from the scalp thus allowing different lengths for any of the captured hair bunches.

Figure 13:
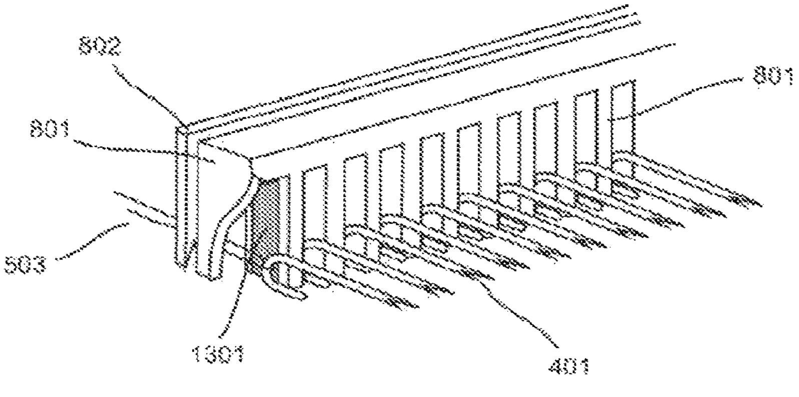
FIG. 13 shows a method of measuring the presence of hair in the combs.

FIG. 13 shows one method of detecting the length of hair on the scalp of a person where the teeth 801 of the toothed array are of insulating rubber and each tooth 801 of the toothed array has a conductive contact strip 1301 on a lateral surface of the tooth 801. Metallic comb elements 401 are biased to contact the tooth lateral surface, either by bias in the comb element or by an offsetting from the vertical of the lateral surface of the tooth, and will normally contact the surface of strip 1301 when no hair is present. If a hair bunch is located between the comb and the surface 1301 there will not be conductive contact until the cutting subassembly 303 and the comb support subassembly 403 have been moved away from the scalp sufficiently that the hair falls from the comb and no longer prevents the comb element 401 from contacting contact strip 1301. In this way the length of the hair at any position on the scalp of a person may be measured. Other methods of conductively or optically determining when a hair leaves the comb elements 401 may be used.

Figure 14A:
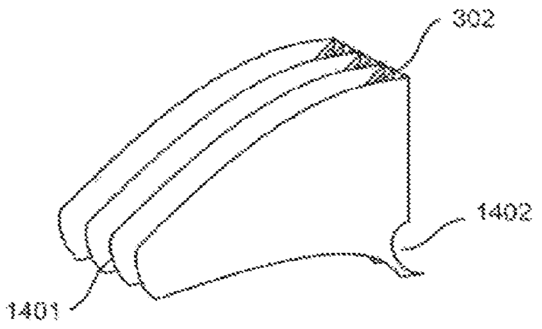
FIG. 14A, 14B show the hair comb of the cutting device of FIG. 3.
Figure 14B:
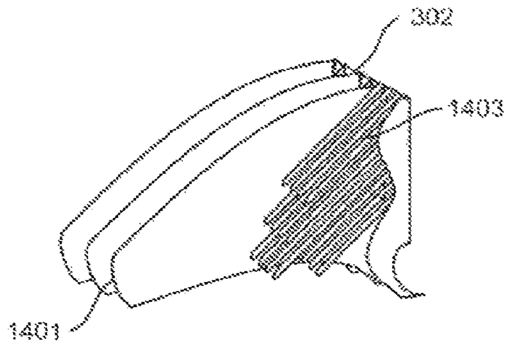

FIG. 14A shows the hair guide 302 which separates the hair with a comb structure having vanes 1401 into bunches to be presented to comb elements 401. Between each pair of vanes 1401 of the comb structure is a hole 1402 through which comb elements 401 can project. FIG. 14B additionally shows a pin matrix 1403 consisting of an array of elongate pins of limited flexibility positioned between vanes 1401. Preferably the pins are of cross section between 0.1 mm wide and 1 mm wide and between 0.2 mm and 2 mm high. The pins 1403 act to prevent entanglement of entrained hair and assist in providing a consistent cut length. Preferably the pins are at substantially 60 degrees from normal to the scalp or substrate but other angles provide a hair separation effect.

Figure 15:
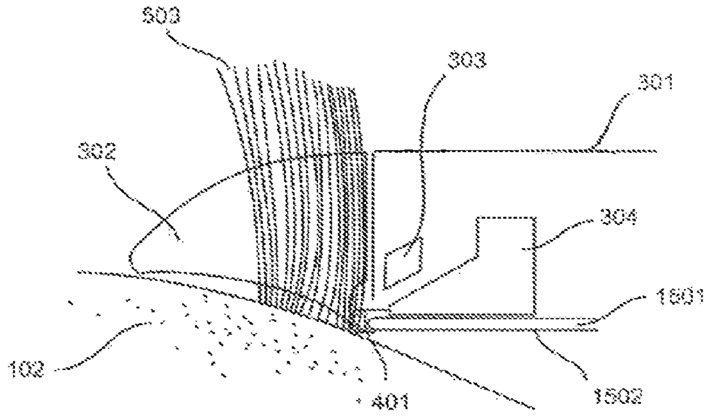
FIG. 15 shows one method of removing hair from the hair measuring zone of the cutting device of FIG. 3.
Figure 16:
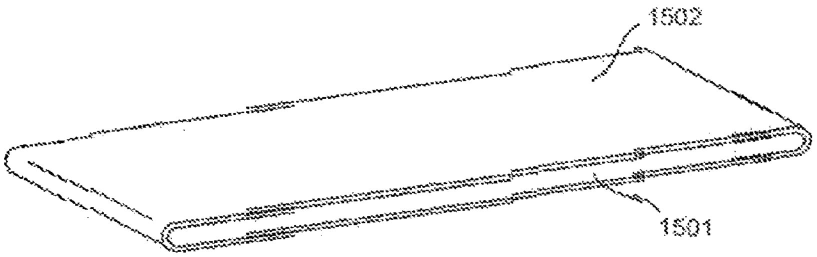
FIG. 16 shows a hair removal belt.
Figure 17A:
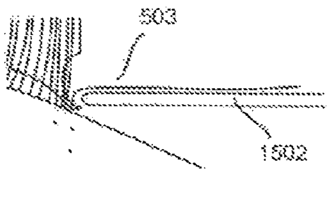
FIGS. 17A, 17B, 17C show the process of removing uncut hair from the cutting or measuring zone using a hair removal belt.
Figure 17B:
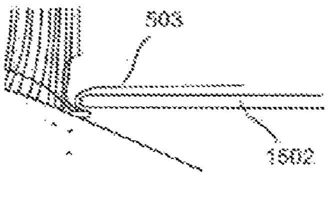
Figure 17C:
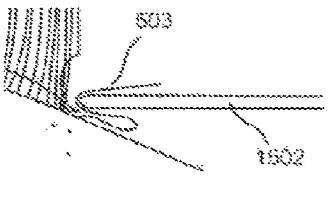

FIG. 15 shows a sectioned view of a hair guide 302 being pushed to the left through hair 503 on the scalp 102 of a user. As hair enters the vicinity of a comb element 401 it is entrained in the comb element as the body 304 of the comb support is traversed to the right. When the hair exits all of the comb elements of the cutting and measuring assembly 304 it slackens and is engaged by an anti-clockwise rotating belt 1502 located on an elongate body 1501. FIG. 16 shows the belt 1502 and supporting body 1501 in more detail. Preferably belt 1502 is of a retentive nature, as for instance a silicone rubber or a compactly hooked version of a hook and loop fabric, while body 1501 has a low coefficient of friction, as for instance a PTFE (polytetrafluoroethylene) coating. As better seen in FIGS. 17A, B and C the slackened hair is entrained by belt 1502 and progressively moved below it to lie on the scalp again.

Figure 18:
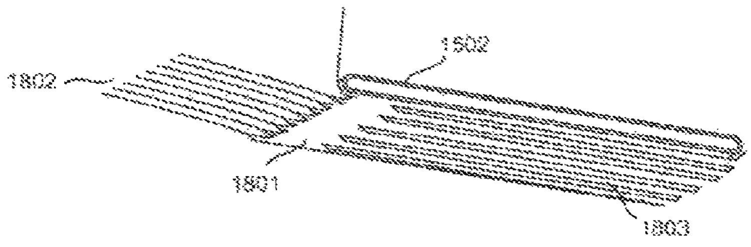
FIG. 18 shows a base plate protecting a persons scalp from the hair removal belt.

FIG. 18 shows a shield 1801 for belt 1502 with extended guide teeth 1802 and distancing fins 1803 intended to maintain the belt above the hair on the persons scalp.

Figure 19A:
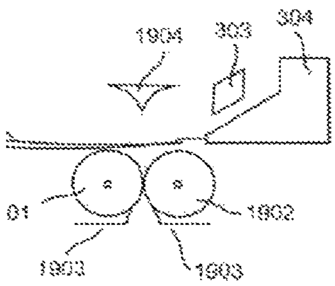
FIGS. 19A, 19B and 19C show hair removal rollers for removing cut hair from the cutting device.
Figure 19B:
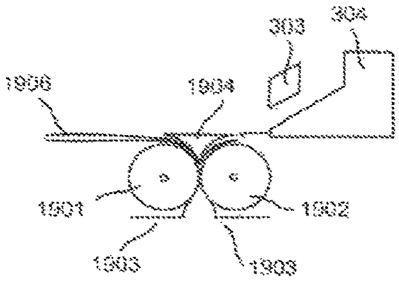
Figure 19C:
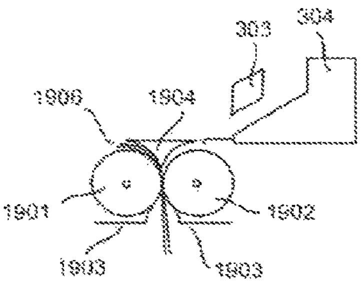

FIGS. 19A, B and C show the action of hair removal rollers generally designated 308 in FIG. 3. The rollers are intended to remove cut hair from within the body of cutting and measuring device 301. When measuring and cutting subassemblies 303, 304 traverse to the right they may drag cut hair with them, and other cut hair ends may gather within the body of device 301. When fully traversed a lever 1904 may be lowered to engage the surface of smooth counter-rotating rollers 1901, 1902. This action feeds hairs and hair ends into the pinch point between the rollers and downwards between them. Any hair adhering to the rollers is stripped by hair guards 1903 which contact each roller. Alternatively hair may be removed by a vacuum unit attached to the device 301 or by a belt of filamentary hooked material as used in hook and loop fasteners and moving between a pair of driven rollers. Once the removal is complete lever 1904 is raised and the measuring and cutting subassemblies traversed to the left.

Figure 20:
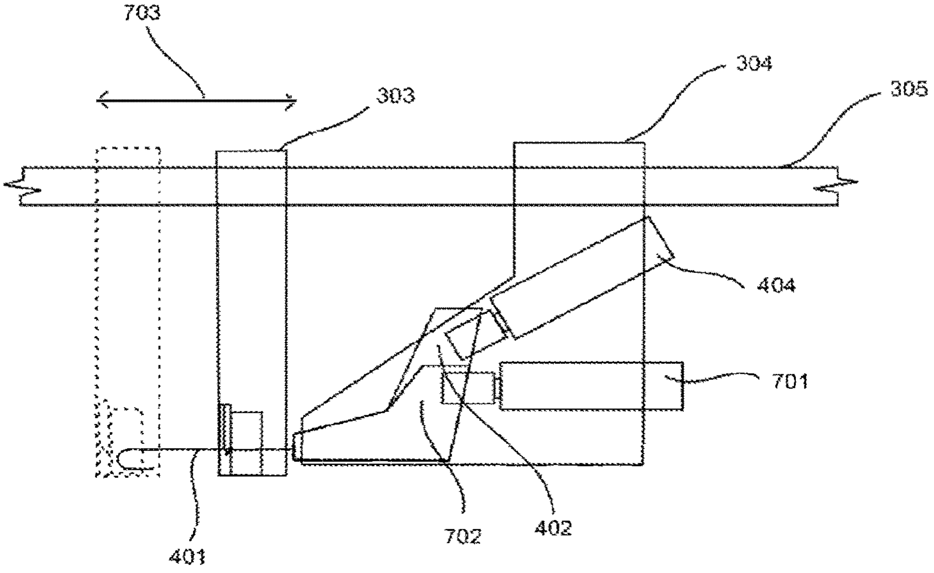
FIGS. 20 and 21 show side and perspective views of a variant comb and cutter unit.

FIG. 20 shows a variation of the combs and cutters of FIG. 7 in which the movement of the cutter head 303 is substantially in the plane of the longitudinal rails 305 rather than being inclined to it as in FIG. 7. This reduces the complexity of the cutting head drive.

Figure 21:
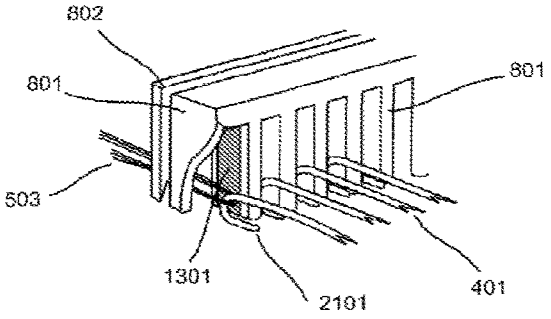

FIG. 21 shows a variation of the combs 401 with comb delimiting tooth blocks 801 and a transverse reciprocable cutting blade 802. The teeth 801 are rigid but covered in a conductive coating 1301. Conductive comb elements 401 are biased against the conductive coating 1301 in normal operating but when hair 503 is entrained or retained in the comb it is pulled away from the conductive coating. This allows detection of the presence of hair in the combs as they are withdrawn from the scalp and allows cutting the hair at the required distance. The bent tip 2101 of the combs may be substantially in the plane of the side of blocks 801 and may be biased against them by torsion in the comb elements.

The device 106 communicates with control module 105, typically via Bluetooth or some other short range radio communication. Using the positioning information received from the spaced optical sensors on the device body the control module can calculate the current position of the sensors in relation to the position establishing modules 104. From this the orientation of the device can be calculated, and using the known dimensions of the device it is possible to calculate where the tip of hair guide 302 is located.

Camera 103 allows the current location and orientation of a head 102 to be calculated, so it is possible to calculate where the tip of the hair guide 302 is in relation to head 102.

Moving device 106 over a persons scalp allows the shape of a persons head to be recorded, and operating the comb unit 304 with no cutting action while this is done allows the hair length to be measured and mapped to the head shape.

Alternatively, once the head shape is recorded, a hair style may be chosen to be applied and the device 106 moved over the head with both the comb unit 304 and cutting unit 303 operating to apply the style to a persons head.

Other variations of the invention are possible, for instance the pin matrix of FIG. 14B may be replaced by vacuum suction to disentangle hairs, or by a loose array of bristles.

It is to be understood that even though numerous characteristics and advantages of the various embodiments of the present invention have been set forth in the foregoing description, together with details of the structure and functioning of various embodiments of the invention, this disclosure is illustrative only, and changes may be made in detail so long as the functioning of the invention is not adversely affected. For example the particular elements of the hair cutting and measuring device may vary dependent on the particular application for which it is used without variation in the spirit and scope of the present invention.

In addition, although the preferred embodiments described herein are directed to cutters for use in a hair grooming system, it will be appreciated by those skilled in the art that variations and modifications are possible within the scope of the appended claims.

INDUSTRIAL APPLICABILITY

The hair cutting and measuring device of the invention is used in the measurement and creation of a hair style and is used in the hair dressing industry. The present invention is therefore industrially applicable.

The invention claimed is:

1. A hair length cutting device configured to cut hair on a substrate to a length, the hair length cutting device comprising:

a body having a first end for engagement with the substrate in use;

at least one hair retaining comb shaped to slidably entrain at least one hair adjacent the substrate and being retractable via translation from the first end while retaining slidably entrained hair;

a cutting device configured to cut the at least one hair slidably entrained by the at least one hair retaining comb to a desired length; and a motor, wherein the at least one hair retaining comb is retractable under the control of the motor.

2. The hair length cutting device of claim 1, wherein:

the hair length cutting device comprises a first hair retaining comb and a second hair retaining comb, and the cutting device is configured to cut the least one hair retained by the first hair retaining comb independently of at least one hair retained by the second hair retaining comb.

3. The hair length cutting device of claim 1, wherein the at least one hair retaining comb comprises a loop shaped to slidably entrain hair.

4. The hair length cutting device of claim 1, wherein the hair length cutting device further comprises a comb tooth set comprising one or more transfer teeth configured to move the at least one hair adjacent the substrate into engagement with the loop of the at least one hair retaining comb.

5. The hair length cutting device of claim 1, wherein:

the hair length cutting device further comprises a rail, and the at least one hair retaining comb is retractable from the first end along the rail.

6. The hair length cutting device of claim 1, wherein the hair length cutting device further comprises a hair guide.

7. The hair length cutting device of claim 1, wherein the hair length cutting device is configured to conductively detect the at least one hair within at the at least one hair retaining comb.

8. The hair length cutting device of claim 1, wherein the hair length cutting device is configured to optically detect the at least one hair within the at least one hair retaining comb.

9. The hair length cutting device of claim 1, wherein the hair length cutting device is configured to cut the at least one hair to a length depending on the position of the at least one hair on the substrate.

10. A hair length cutting device configured to cut hair on a substrate to a length, the hair length cutting device comprising:

a body having a first end for engagement with the substrate in use;

at least one hair retaining comb shaped to slidably entrain at least one hair adjacent the substrate and being retractable in a substantially longitudinal direction from the first end while retaining slidably entrained hair;

a cutting device configured to cut the at least one hair slidably entrained by the at least one hair retaining comb to a desired length; and a motor, wherein the at least one hair retaining comb is retractable under the control of the motor.

11. The hair length cutting device of claim 10, wherein:

the hair length cutting device comprises a first hair retaining comb and a second hair retaining comb, and the cutting device is configured to cut the at least one hair retained by the first retaining comb independently of at least one hair retained by the second hair retaining comb.

12. The hair length cutting device of claim 10, wherein the at least one hair retaining comb comprises a loop shaped to slidably entrain hair.

13. The hair length cutting device of claim 10, wherein the hair length cutting device further comprises a comb tooth set comprising one or more transfer teeth configured to move the at least one hair adjacent the substrate into engagement with the at least one hair retaining comb.

14. The hair length cutting device of claim 10, wherein:

the hair length cutting device further comprises a rail, and the at least one hair retaining comb is retractable from the first end along the rail.

15. The hair length cutting device of claim 10, wherein the hair length cutting device further comprises a hair guide.

16. The hair length cutting device of claim 10, wherein the hair length cutting device is configured to cut the at least one hair to a length depending on the position of the at least one hair on the substrate.

17. A hair length measuring and cutting device for measuring and/or cutting hair on a substrate, the hair length measuring and cutting device comprising:

a body having a first end for engagement with the substrate in use;

at least one hair retaining comb shaped to slidably entrain at least one hair adjacent the substrate and being retractable in a substantially longitudinal direction from the first end while retaining slidably entrained hair;

a measuring device configured to measure a length of the at least one hair slidably entrained by the at least one hair retaining comb;

a cutting device configured to cut the at least one hair slidably entrained by the at least one hair retaining comb to a desired length; and a motor, wherein the at least one hair retaining comb is retractable under the control of the motor.

18. The hair length measuring and cutting device of claim 17, wherein:

the hair length measuring and cutting device is configured to map the measured length of the at least one hair to the position of the at least one hair on the substrate; and the hair length measuring and cutting device is configured to cut the at least one hair to a length depending on the position of the at least one hair on the substrate.

* * * * *